United States Patent [19]
Fortenberry et al.

[11] Patent Number: 5,535,876
[45] Date of Patent: Jul. 16, 1996

[54] CHICKEN PROCESSING CONVEYOR

[75] Inventors: Larry Fortenberry, Albertville; Bobby W. Copeland, Boaz, both of Ala.

[73] Assignee: D & F Equipment Sales, Inc., Crossville, Ala.

[21] Appl. No.: 406,168

[22] Filed: Mar. 17, 1995

[51] Int. Cl.$^6$ ................................................. B65G 25/00
[52] U.S. Cl. ................................ 198/803.12; 198/803.01
[58] Field of Search ........................... 198/803.01, 803.11, 198/803.12, 831, 850, 851, 852, 853, 860.1

[56] References Cited

U.S. PATENT DOCUMENTS

| | | | |
|---|---|---|---|
| 1,749,224 | 3/1930 | Ostricher | 198/803.12 |
| 2,884,118 | 4/1959 | Williams | 198/852 |
| 3,641,831 | 2/1972 | Palmaer. | |
| 4,385,419 | 5/1983 | Cantrell | 17/11 |
| 4,611,710 | 9/1986 | Mitsufuji | 198/803.01 |
| 4,927,002 | 5/1990 | Springman | 198/803.12 X |
| 4,930,620 | 6/1990 | Springman | 198/803.12 X |

*Primary Examiner*—James R. Bidwell
*Attorney, Agent, or Firm*—Veal & Marsh

[57] ABSTRACT

An apparatus for conveying poultry along a processing line for deboning. The apparatus includes a number of poultry mounts connected to each other using a chain of cooperative links to form a continuous conveyor. The pivotal junctures between each of the cooperative links are configured so as to provide both lateral and vertical flexibility, allowing the conveyor to be positioned along curves and inclines. Each of the links has a linking post extending from one side and a pair of linking arms extending from the opposite side. The linking arms are spaced apart to receive the linking post of an adjacent link. The links are connected by pins which extend through apertures in the linking arms and through a bore in the linking post of the adjacent link. The diameter of the bore in the linking post is larger than that of the pin, so that the connection is flexible laterally. Each of the poultry mounts includes a base block which is stabilized by laterally extending flanges positioned to slide along guide channels in guide members extending along the conveyor frame. Additionally, each mount includes a freely rotatable upper member for holding the poultry carcasses on the mount, so that a worker carving the poultry may easily access all sides of the poultry carcass without repositioning the carcass upon the mount.

12 Claims, 6 Drawing Sheets

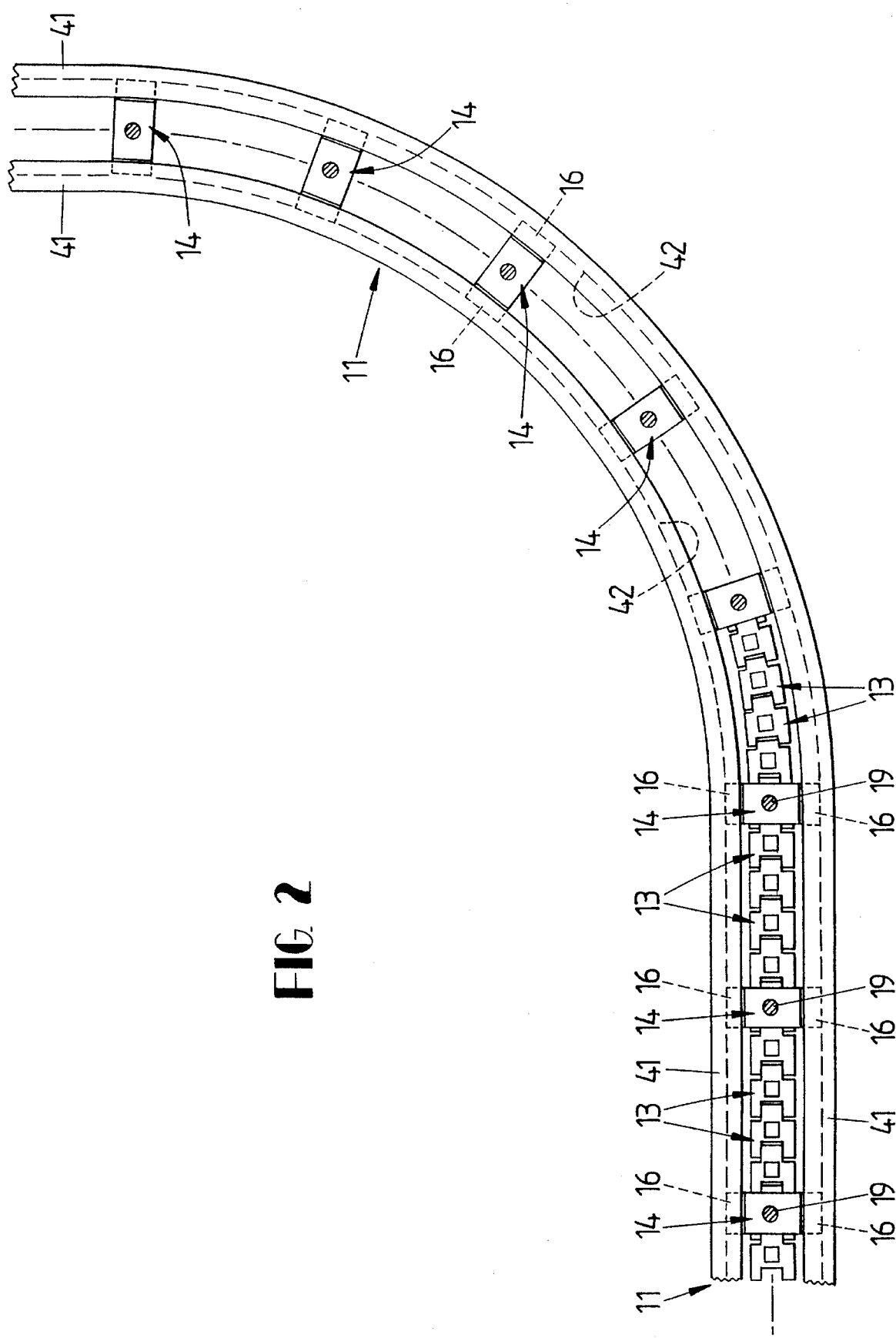

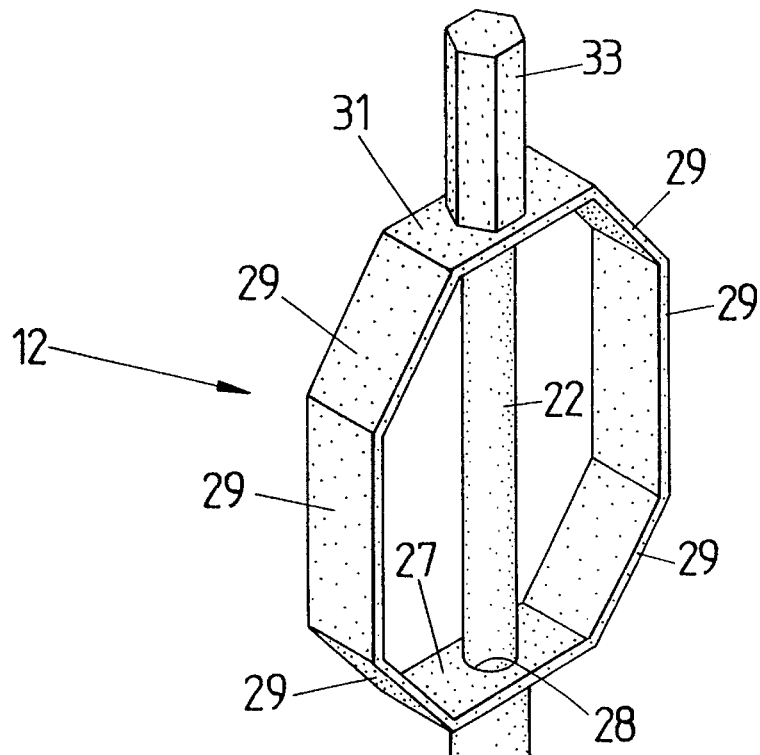
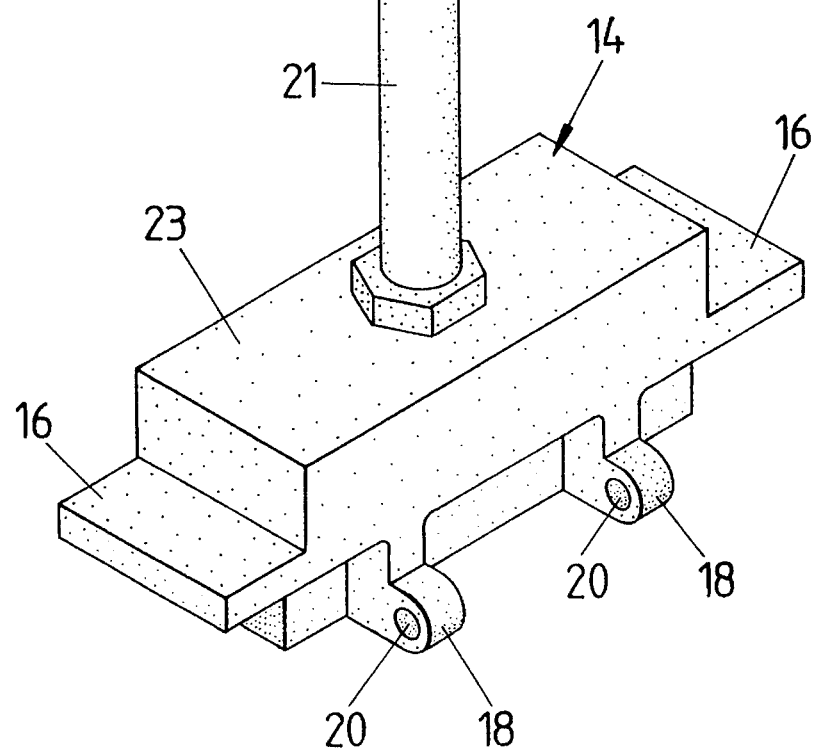
FIG. 3A

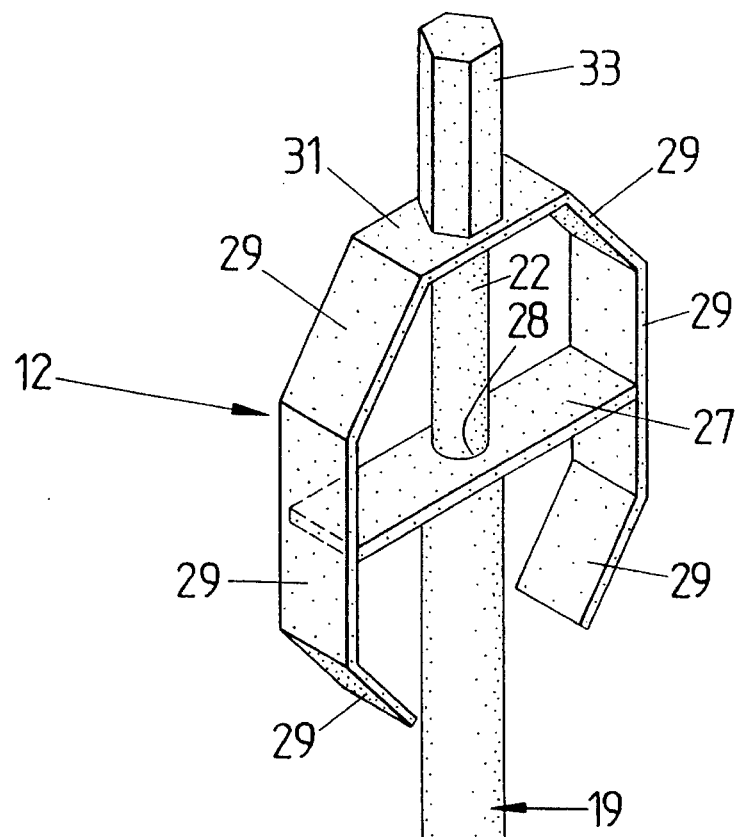
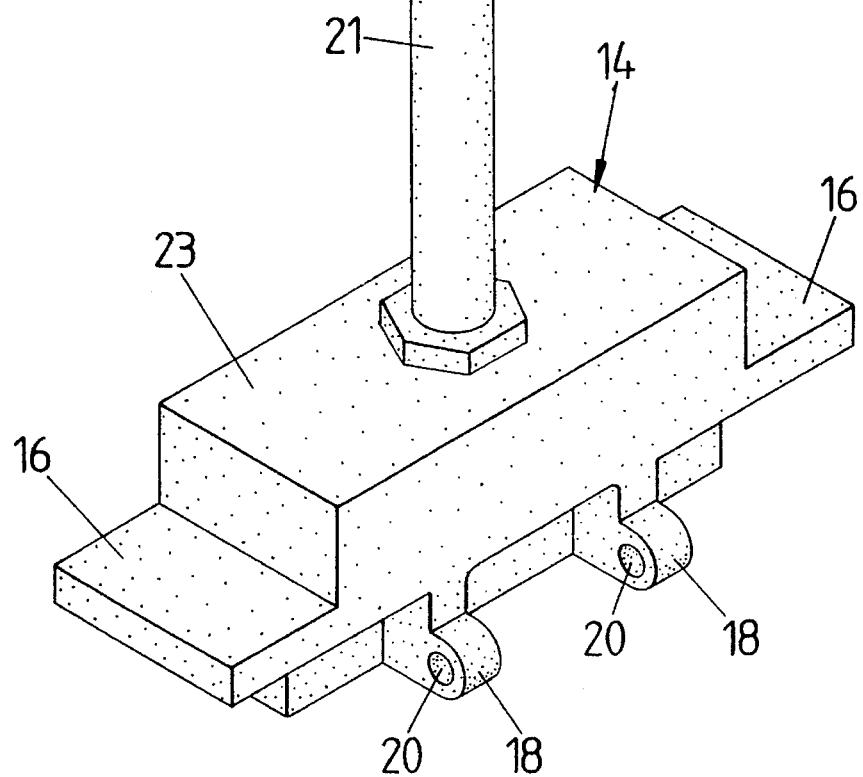
FIG. 3B

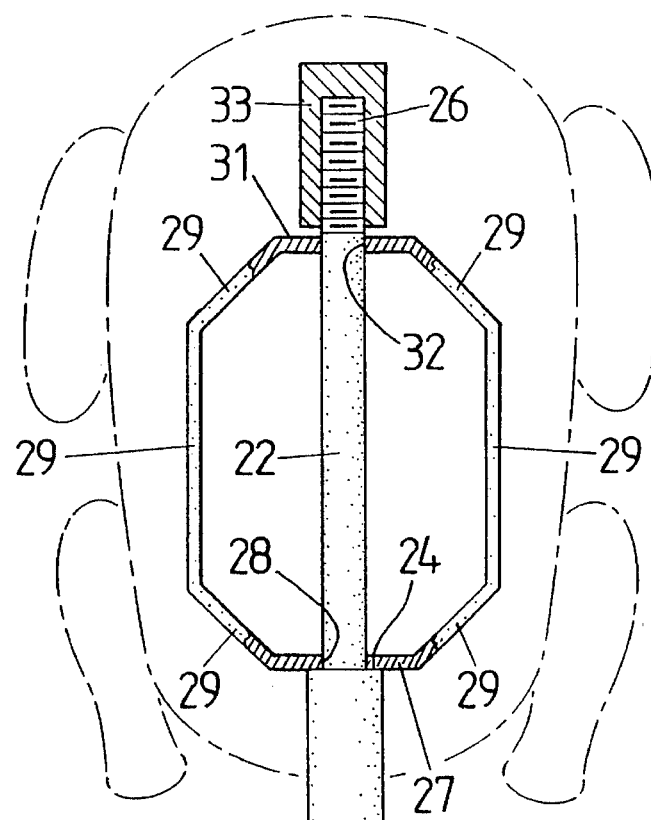
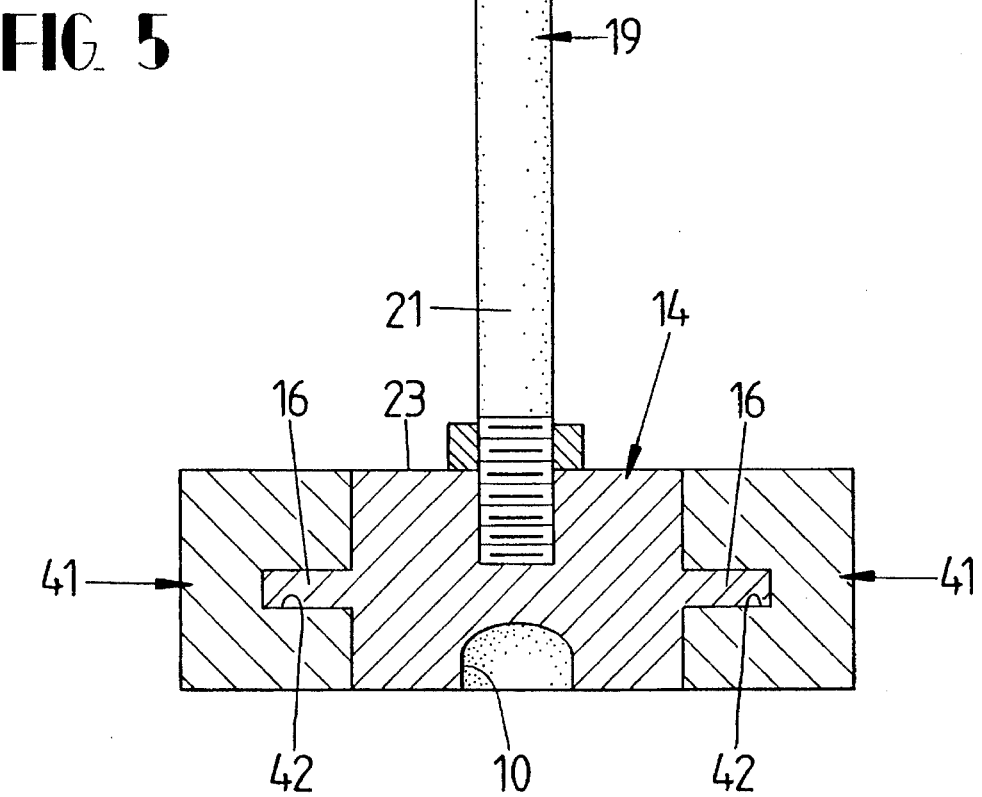
FIG. 5

CHICKEN PROCESSING CONVEYOR

FIELD OF THE INVENTION

The present invention relates to processing poultry. More particularly, the present invention relates to the process of removing portions of meat from carcasses of poultry, particularly chicken. Still more particularly, the present invention relates to an apparatus which allows positioning of the poultry in a proper position for carving by workers along a processing line, and which further allows configuration of the processing line around curves and along inclines to provide for optimal use of available space.

BACKGROUND OF THE INVENTION

Conveyors for processing chicken are currently known in the art. One such conveyor is disclosed in U.S. Pat. No. 4,385,419, issued to Cantrell. The conveyor is formed of rigid segments which interlock to form a continuous conveyor platform, and which extend laterally into guide rails to stabilize the platform upon which the poultry carcasses are supported. The conveyor segments are configured and connected so that the conveyor may only travel along a straight processing line. The conveyor is flexible in a single direction, so that it may invert when it reaches the end of the processing line to travel back to the beginning of the line. The chicken carcasses are supported on deboning "horns," which are rigidly mounted on the conveyor platform. The conveyor disclosed in Cantrell presents a number of problems. First, a processing line using the disclosed apparatus may only be positioned along a straight line. It cannot be positioned around a curve to optimize the use of available floor space. Additionally, the platform disclosed is incapable of ascending along an incline. This presents problems in terms of overall design of the integrated processing plant, in that it limits the capability to raise and lower a conveyor to accommodate a second conveyor crossing beneath it.

A rigidly affixed mount, such as the deboning "horn" disclosed in Cantrell, requires repositioning of the chicken carcass on the mount for access to different sides of the carcass. It is desirable that a worker be able to easily rotate the poultry carcass during carving for easy access to all sides of the carcass.

A further problem with a conveyor of the type disclosed is the inability to thoroughly clean the conveyor. Debris that collects along the edges of the conveyor may not be easily dislodged. The area between the adjacent segments of the conveyor platform is inaccessible for cleaning, except at the ends of the processing line, where the conveyor inverts to change its direction of travel. With the growing public concern about salmonella poisoning, the ability to thoroughly cleanse processing equipment is of prime importance to the poultry processing industry.

SUMMARY OF THE PRESENT INVENTION

With the foregoing in mind, the principal object of the present invention is to provide a conveyor for processing chicken which provides sufficient stability for efficient carving, while having sufficient flexibility to allow configuration of the conveyor around curves and along inclines.

Another object of the invention is to provide a means for supporting a chicken carcass in a stable position for carving, while allowing easy rotation of the carcass.

Yet another object of the invention is to provide a chicken deboning conveyor which may be easily and thoroughly cleansed.

These and other objects of the present invention are accomplished by connecting a plurality of poultry mounts to each other using a chain of cooperative links to form a continuous conveyor. The pivotal junctures between each of the cooperative links are configured so as to provide both lateral and vertical flexibility, allowing the conveyor to be positioned along curves and inclines. Each of the links has a linking post extending from one side and a pair of linking arms extending from the opposite side. The linking arms are spaced apart to receive the linking post of an adjacent link. The links are connected by pins which extend through apertures in the linking arms and through a bore in the linking post of the adjacent link. The diameter of the bore in the linking post is larger than that of the pin, so that the connection is flexible laterally. Each of the poultry mounts includes a base block which is stabilized by laterally extending flanges positioned to slide along guide channels in guide members extending along the conveyor frame. Additionally, each mount includes freely rotatable means for holding the poultry carcasses on the mount, so that a worker carving the poultry may easily access all sides of the poultry carcass without repositioning the carcass upon the mount.

BRIEF DESCRIPTION OF THE DRAWINGS

The foregoing objects and advantages of the present invention will be more readily understood by one skilled in the art by referring to the following detailed description of a preferred embodiment and to the accompanying drawings which form a part of this disclosure, and wherein:

FIG. 2 is a top plan view of the conveyor of the present invention showing the cooperative links connecting the chicken mounts;

FIG. 3A is a perspective view of the upper end of the preferred embodiment of a chicken mount;

FIG. 3B is a perspective view of the upper end of an alternate embodiment of a chicken mount, showing an open-bottom configuration of the rotatable chicken-holding means.

FIG. 5 is a sectional view of a chicken mount.

DETAILED DESCRIPTION OF THE PREFERRED EMBODIMENT

Figure 1:
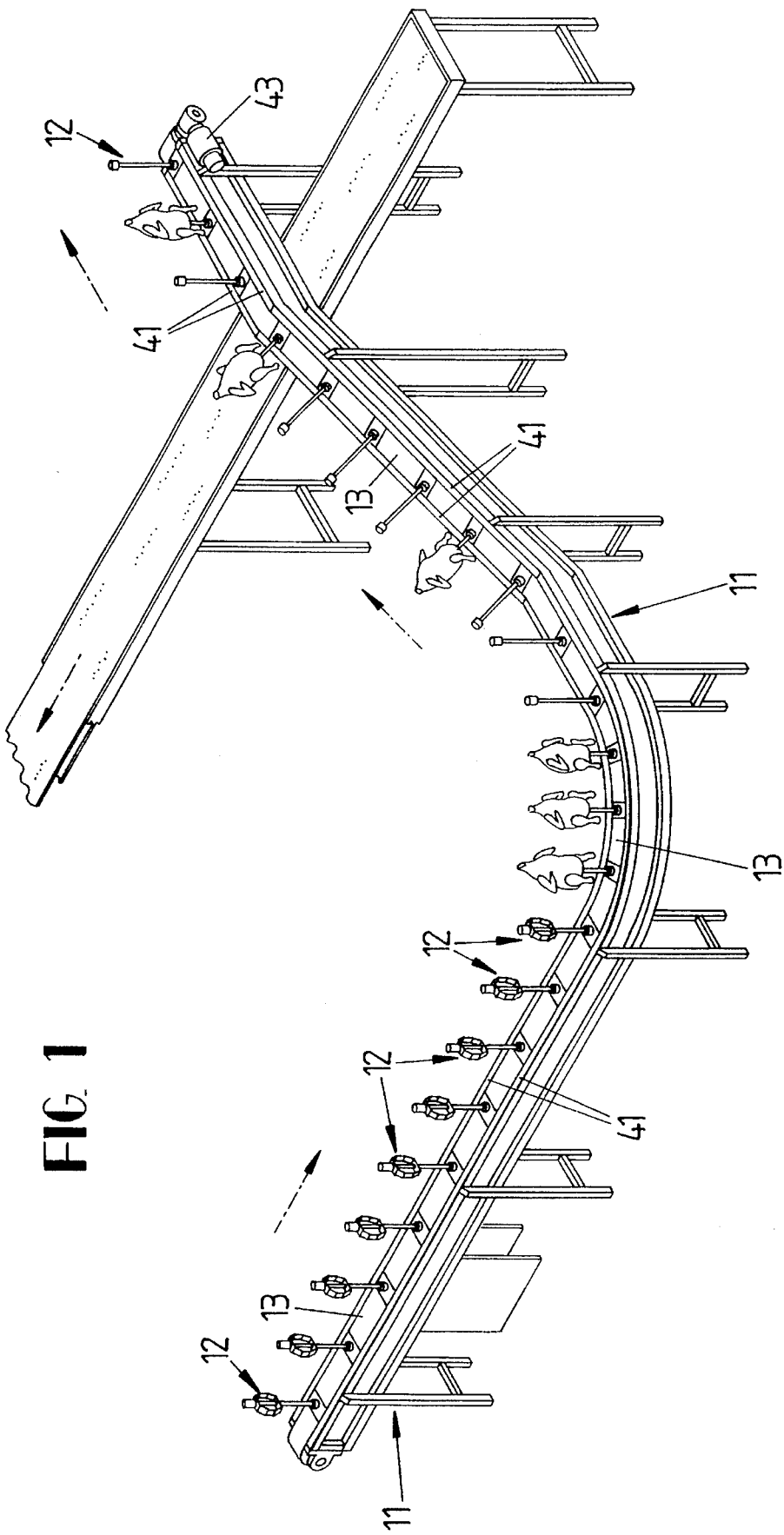
FIG. 1 is a perspective view of the poultry processing conveyor of the present invention, showing a possible configuration including multiple levels of conveyors and positioning along a curve.

As may be seen in FIGS. 1 and 2, the present invention uses a conveyor frame 11 positioned along the desired processing line, and a plurality of chicken mounts 12 joined together by a plurality of cooperative links 13.

As best shown in FIGS. 3A, 3B, 4, and 5, each of the chicken mounts 12 has a substantially rectangular base block 14 with stabilizing flanges 16 extending laterally from two opposite sides. A central recess 10 is formed in the bottom of the base block 14 for engaging the teeth of a sprocket wheel (See FIG. 4). A linking post 17 having a bore 15 defined therethrough extends outwardly from a third side of the base block 14, and a pair of substantially parallel linking arms 18, having apertures 20 defined therethrough, extend outwardly from the remaining side of the base block 14. An elongated support member 19, having a lower segment 21 and an upper end 22, is affixed to and extends substantially perpendicular from the upper surface 23 of the base block 14. The diameter of the upper end 22 is smaller than the transverse dimension of the lower segment 21 of the elongated support member 19, such that a shoulder 24 is formed (see FIG. 5). The upper end 22 of the elongated support member 19 terminates in a threaded portion 26. A positioning platform 27, having an aperture 28 defined therethrough, rests upon the shoulder 24 with the upper rend 22 of the elongated support member 19 extending through the aperture 28. Side strips 29 are affixed to the ends of the positioning platform 27 and extend substantially vertically therefrom. A top platform 31, also having an aperture 32 defined therethrough, is affixed between the upper ends of the side strips 29. The threaded portion 26 of the upper end 22 of the elongated support member 19 extends through the aperture 32. A nut 33 is threadably engaged with the threaded portion 26 to hold the top platform 31, positioning platform 27, and side strips 29 in rotatable relation with the upper end 22 of the elongated support member 19.

Figure 4:
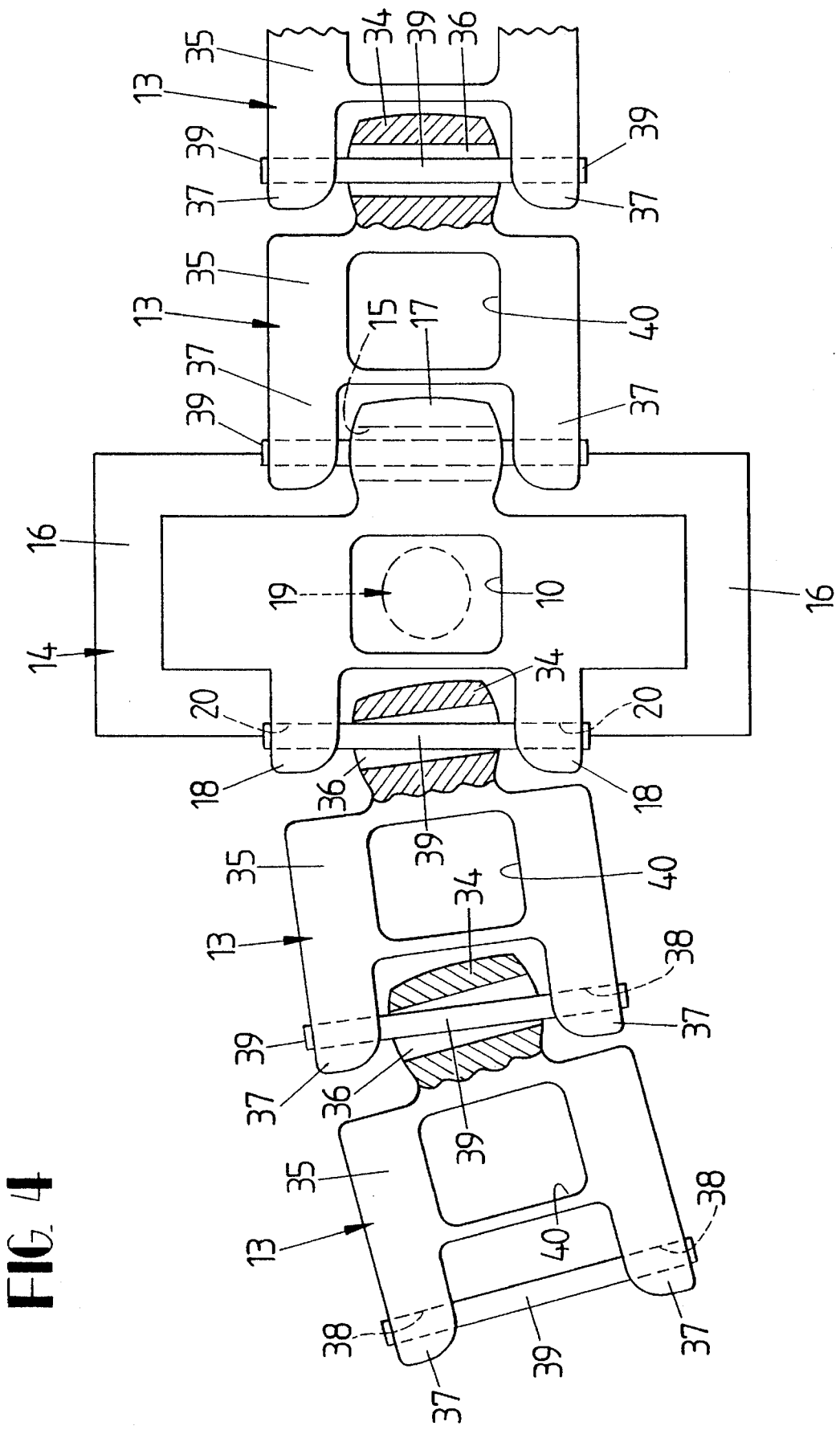
FIG. 4 is a bottom view, partially in section, of the cooperative links of the conveyor, connected to each other and to the base block of a chicken mount.

The cooperative links 13 used to join the chicken mounts 12 are similar to those described in U.S. Pat. No. 3,641,831 issued to Palmaer. As best shown in FIG. 4, each link 13 has a linking post 34 with a bore 36 defined therethrough, and a pair of linking arms 37 having coaxial apertures 38 defined therethrough. The linking post 34 extends outwardly from the link 13 on the side opposite from the linking arms 37, and is dimensioned to fit between the linking arms 37 of an adjacent link 13 or the linking arms 18 of an adjacent base block 14. The links 13 are connected to each other or to adjacent chicken mounts 12 using a plurality of pins 39 which extend through the apertures in the linking arms 37 or 18 and through the bore 36 or 15 in an adjacent linking post 34 or 17. The diameter of the bores 36 in the linking posts 34 of the cooperative links 13 have a dimension which exceeds that of the diameter of the pins 39 sufficiently so that the pins 39 may move laterally within the bore 36. Although the bores 15 in the linking posts of the base blocks 14 of the chicken mounts 12 may likewise be dimensioned to allow lateral movement of the pins 39 therein, it is not necessary to the operation of the invention. Each link 13 has a central aperture 40 formed in the body 35 of the link, for engagement with the teeth of a sprocket wheel.

As shown in FIGS. 1, 2, and 5, the chicken mounts 12 are spaced apart along the conveyor, and are connected by a plurality of links 13. To provide adequate stability for carving, the base blocks 14 are mounted for slidable movement along parallel guide members 41 which extend along the length of the conveyor frame 11. The stabilizing flanges 16 of the base blocks extend into opposing guide channels 42 defined along the length of the parallel guide members 41. The links 13, however, do not extend laterally to meet the guide members 41 or the conveyor frame 11, providing an open configuration which facilitates cleaning of the conveyor. A drive motor 43 (FIG. 1) rotates a sprocket wheel (not shown) which engages the central apertures 40 in the body of the links and the recesses 10 in the bottom of the base blocks 14 of the chicken mounts 12 to urge the conveyor along the frame 11.

Thus, the present invention provides an advantageous apparatus for conveying chicken along a processing line. While the poultry is stabilized sufficiently for carving, it may be easily rotated by a worker for access to all sides of the carcass, thereby increasing the efficiency of the processing operation. Additionally, the flexibility provided by the cooperative links facilitates designing a processing line configuration that optimizes the use of available floor space in a plant. The open configuration of the conveyor allows thorough cleaning of the apparatus.

While I have shown my invention in a single form, it will be obvious to those skilled in the art that it is not so limited but is susceptible of various changes and modifications without departing from the spirit thereof.

What I claim is:

1. An apparatus for conveying chicken to be deboned along a processing line, comprising:
    (a) a frame, positioned along said processing line;
    (b) a pair of parallel elongated guide members, attached to said frame, said guide members having opposing guide channels defined therein;
    (c) a plurality of chicken mounts, slidably positioned in said opposing guide channels of said guide members, each of said chicken mounts comprising:
        (i) a base block, positioned intermediate said parallel guide members, said base block having stabilizing flanges extending outwardly therefrom, said flanges mounted for slidable movement within said guide channels of said parallel guide members;
        (ii) an elongated support member, having a lower segment and an upper end, said lower segment affixed to said base block; and
        (iii) means, rotatably attached to said upper end of said elongated support member, for holding one of said chickens to be deboned; and
    (d) linking means, positioned intermediate said plurality of chicken mounts and forming therewith a continuous closed loop, said linking means being flexible horizontally, such that said linking means may be urged along a curve, said linking means further being flexible vertically, such that said linking means may be urged along an ascending incline and a descending incline.

2. An apparatus as defined in claim 1, wherein said linking means comprises a plurality of cooperative links connected by a plurality of pins, each of said links comprising:
    (a) a linking post, having a bore defined therethrough, said bore dimensioned so as to allow lateral movement of one of said pins positioned therein; and
    (b) a pair of substantially parallel linking arms, extending from said linking post, said arms spaced to allow positioning of the linking post of an adjacent cooperative link therebetween, said arms having coaxial apertures defined therethrough for receiving one of said pins.

3. An apparatus as defined in claim 2, wherein each of said base blocks of said chicken mounts are connected to said linking means by a plurality of pins, and wherein each of said base blocks further comprises:
    (a) a linking post, extending from said base block, said linking post having a bore defined therethrough; and
    (b) a pair of substantially parallel linking arms extending from said base block on a side opposite said linking post, said arms spaced to allow positioning of the linking post of a first adjacent cooperative link therebetween, said arms having coaxial apertures defined therethrough for receiving one of said pins; and wherein one of said pins extends through the apertures in said linking arms of said base block and through the bore in said linking post of said first adjacent cooperative link, and wherein said linking post of said base block is positioned between said linking arms of a second adjacent cooperative link, and wherein one of said pins extends through said apertures in said linking arms of said second adjacent cooperative link and through said bore in said linking post of said base block, such that said base block is connected intermediate said first and second adjacent cooperative links.

4. An apparatus as defined in claim 3, wherein said upper end of said elongated support member of said chicken mount terminates in a threaded portion, and wherein said upper end has a diameter smaller than the transverse dimension of said lower segment of said elongated support member such that a shoulder is formed intermediate said lower segment of said elongated support member and said upper end, and wherein said rotatable holding means comprises:

(a) a positioning platform, having an aperture defined therethrough, said upper end of said elongated support member extending through said aperture in said positioning platform such that said positioning platform rests on said shoulder of said elongated support member;

(b) at least two side strips, positioned laterally of said positioning platform and spaced from said elongated support member; and (c) a retaining nut, threadably engaged with said threaded portion superjacent said positioning platform, such that said positioning platform is rotatably affixed to said upper end of said elongated support member.

5. An apparatus as defined in claim 4, wherein said rotatable holding means further comprises a top platform, intermediate said retaining nut and said retaining platform and affixed intermediate said side strips, said top platform having an aperture defined therethrough, said threaded portion extending through said aperture in said top platform.

6. An apparatus for transporting a plurality of chickens to be deboned along a conveyor line, comprising:

(a) a plurality of chicken mounts spaced along said conveyor line, each of said chicken mounts comprising:
 (i) a base block;
 (ii) an elongated support member, having a lower segment and an upper end, said lower segment of said support member affixed to said base block such that said support member extends substantially vertically upwardly from said base block; and
 (iii) means, rotatably attached to said upper end of said elongated support member, for positioning one of said chickens on said chicken mount;

(b) means for linking each of said mounts to adjacent mounts, such that a continuous conveyor is formed, said means being flexible so as to allow urging of said conveyor along a horizontal curve, said means further being flexible so as to allow said conveyor to ascend or descend along an incline;

(c) a support frame, positioned along said conveyor line to hold said continuous conveyor;

(d) first and second retaining means, attached to said frame and extending longitudinally along said conveyor line, on opposite sides of said chicken mounts, such that said conveyor is held in place on said frame.

7. An apparatus as defined in claim 6, wherein said first and second retaining means each comprise an elongated guide member having a guide channel defined therein.

8. An apparatus as defined in claim 7, wherein said base block further comprises stabilizing flanges extending laterally from said base block, such that said flanges are slidably mounted in said guide channels of said guide members.

9. An apparatus as defined in claim 8, wherein said upper end of said elongated support member terminates in a threaded portion, and wherein said upper end has a diameter smaller than the transverse dimension of said lower segment of said elongated support member such that a shoulder is formed intermediate said lower segment of said elongated support member and said upper end, and wherein said rotatable positioning means comprises:

(a) a top platform, having an aperture defined therethrough for receiving said threaded portion, said threaded portion extending through said aperture;

(b) first and second side strips, affixed to and depending from said top platform, said side strips spaced outwardly from said upper end of said support member;

(c) a positioning platform, affixed intermediate said first and second side strips, below and spaced from said top platform, said positioning platform having an aperture defined therethrough for rotatably receiving said upper end of said elongated support member, with said positioning platform supported on said shoulder of said elongated support member; and (d) a retaining nut, threadably engaged with said threaded portion outwardly from said top platform.

10. An apparatus as defined in claim 9, wherein said linking means comprise a plurality of cooperative generally y-shaped links connected by a plurality of pins, each of said links comprising:

(a) a linking post, said post having a bore defined therethrough; and (b) a pair of substantially parallel linking arms, affixed to said linking post and extending therefrom, said arms having coaxial apertures defined therethrough, said arms being spaced to allow positioning of an adjacent linking post on a cooperative generally y-shaped link therebetween, such that one of said pins passes through the apertures in said linking arms and through the bore in said adjacent linking post, thereby flexibly connecting said links.

11. An apparatus as defined in claim 10, wherein each of said blocks are connected to said linking means by a plurality of pins and wherein each of said base blocks further comprises:

(a) a pair of substantially parallel linking arms extending outwardly from said block, said linking arms having coaxial apertures defined therethrough, said arms being spaced to allow positioning of an adjacent linking post on a cooperative link therebetween, such that one of said pins passes through the apertures in said linking arms of said base block and through the bore in said adjacent linking post of said cooperative link; and (b) a linking post, said post having a bore defined therethrough, said post dimensioned to fit between said linking arms of an adjacent link such that one of said pins passes through the apertures in said linking arms of said link and through the bore in said linking post of said base block, thereby connecting said base block to said link.

12. An apparatus as defined in claim 11, wherein said bore in said linking post of said link has a wall, and wherein said wall is spaced from said pin extending therethrough such that said pin is movable laterally within said bore.

\* \* \* \* \*